United States Patent [19]

Ohyama

[11] Patent Number: 4,541,029

[45] Date of Patent: Sep. 10, 1985

[54] OVER-LOAD AND LIGHT-LOAD PROTECTION FOR ELECTRIC MACHINERY

[75] Inventor: Akira Ohyama, Osaka, Japan

[73] Assignee: Tsubakimoto Chain Co., Japan

[21] Appl. No.: 538,376

[22] Filed: Oct. 3, 1983

[30] Foreign Application Priority Data

Oct. 6, 1982 [JP] Japan ................................ 57-174505

[51] Int. Cl.³ .......................... H02H 3/10; H02H 7/08
[52] U.S. Cl. ........................................ 361/31; 361/87; 361/90; 318/430
[58] Field of Search ........................ 361/31, 30, 29, 33, 361/90, 89, 87, 22, 24; 318/430, 431

[56] References Cited

U.S. PATENT DOCUMENTS 3,742,303 6/1973 Dageford .............................. 361/31
4,194,145 3/1980 Ritter ................................... 318/431

Primary Examiner—A. D. Pellinen
Assistant Examiner—Hong K. Choe
Attorney, Agent, or Firm—Steele, Gould & Fried

[57] ABSTRACT

An apparatus for protecting machinery driven by electric motors from operating during over-load and light-load conditions, comprising: a current transformer operatively associated with an electrical supply line for the induction motor; a current-voltage transforming circuit for generating a control signal having a magnitude proportional to current flowing in the supply line; an upper limitation magnitude comparator for generating an over-load signal output whenever the magnitude of the control signal exceeds a predetermined upper safety value; a lower limitation magnitude comparator for generating a light-load signal output whenever the magnitude of the control signal is less than a predetermined lower safety level; an inhibitable protection timer for producing a fault persistence output signal whenever one of the over-load and light-load signal outputs is generated for a period of time longer than a predetermined protection time; a steady state timer for inhibiting an enable output signal for a predetermined period of time after start-up and during shut-down of the electric motor; a start-up/shut-down comparator for producing an output signal for enabling operation of the protection timer and the steady state timer whenever the magnitude of the control signal exceeds a predetermined reference value corresponding to an electric current lower than the unloaded current of the electric motor; and, an output relay for interrupting operation of the electric motor when both the protection timer and steady state timer produce time coincident output signals.

9 Claims, 2 Drawing Figures

OVER-LOAD AND LIGHT-LOAD PROTECTION FOR ELECTRIC MACHINERY

BACKGROUND OF THE INVENTION

1. Field of the Invention

This invention relates to the field of protective devices for electric machinery, in general, and in particular, to protective devices which detect over-load and light-load conditions in electric machinery.

2. Prior Art

Many kinds of machinery, driven by electric motors or other kinds of electrical drive mechanisms, usually require over-load and light-load protection. In the case of over-load conditions, excessive heating and current draw can result in destruction of the machinery, and in some cases, a general fire hazard. Under light-load conditions, such machines will tend to operate at unsafe higher speeds or rates of rotation, engendering thermal damage and structural failure. In either case, the risk of explosion or other catastrophic failure is a distinct possiblity.

A good example is that of a ram which is operated under a no-load condition, that is, at a decreased water level. The pump itself is not only damaged, but the cooling unit to which the water is otherwise fed from the pump is unduly heated as well. Another example is that of an operating chain apparatus in a sludge water processing equipment. Such chains are immersed in the sludge water and are particularly subject to corrosion. When such chains snap, as expected from time to time, the breaking of the chain should be sensed in order to sound an alarm.

In the conventional type of protective devices for electric machinery known heretofore, for use in protecting against the effects of over-load and light-load conditions, a contact in the control unit of an electric motor is closed simultaneously with start-up of the motor, starting a timer, in order to prevent the protective device from operating during the start-up period and the opening of a contact in the control unit is utilized in order to distinguish the no-load operation of a motor from shut-down thereof. In such systems, the protective device must be designed and installed fully in relationship with said contacts in the control unit for the electric motor of the particular machinery.

SUMMARY OF THE INVENTION

It is an object of this invention to provide a protective device which eliminates the need for interconnection and interrelationship with the motor and/or drive mechanism of the machinery. Instead, means are provided for sensing an electric current in one of the wires supplying the electric motor, the sensed signals being utilized to provide the desired over-load and light-load detection.

In a presently preferred embodiment, a current transformer is so disposed relative to an electric supply line for an induction motor as to develop a voltage signal corresponding to the magnitude of current flowing through the supply line. This voltage level is compared to an upper reference voltage signal and to a lower reference voltage signal. Voltage levels above the higher level and voltage levels below the lower level indicate one of an over-load or light-load condition. In order to avoid spurious indications from transient conditions a first timer is preferably employed with regard to assuring that such over-load or light-load condition persists for a minimum length of time. A second timing circuit is preferably provided in order to render the system ineffective during the known transient conditions which exist when the electric machinery is first started, or is stopped.

In a presently preferred embodiment, an apparatus for protecting electric machinery driven by electric induction motors from operating under over-load and light-load conditions comprises: inductive means, operatively associated with an electrical supply line for the induction motor, for generating a control signal having a magnitude proportional to current flowing in the supply line; an upper limitation magnitude comparator for generating an over-load signal output whenever the magnitude of the control signal exceeds a predetermined upper safety value; a lower limitation magnitude comparator for generating a light-load signal output whenever the magnitude of the control signal is less than a predetermined lower safety level; an inhibitable protection timer for producing a fault persistence output signal whenever one of the over-load and light-load signal outputs is generated for a period of time longer than a predetermined protection time; a steady state timer for inhibiting an enable output signal for a predetermined period of time after start-up and during shut-down of the electric motor; a start-up/shut-down comparator for producing an output signal for enabling operation of the protection timer and the steady state timer whenever the magnitude of the voltage signal exceeds a predetermined reference value corresponding to an electric current lower than the unloaded current of the electric motor and, an output relay for interrupting operation of the electric motor when both the protective timer and the start-up/shut-down timer produce output signals. The protective device may also comprise a test circuit for generating voltage test signals in place of the voltage signal generated by the inductive means, one of the voltage test signals having a magnitude greater than the upper safe value, one of the voltage test signals having a magnitude less than the lower safe value yet greater than the reference voltage signal.

BRIEF DESCRIPTION OF THE DRAWINGS

For the purpose of illustrating the invention there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
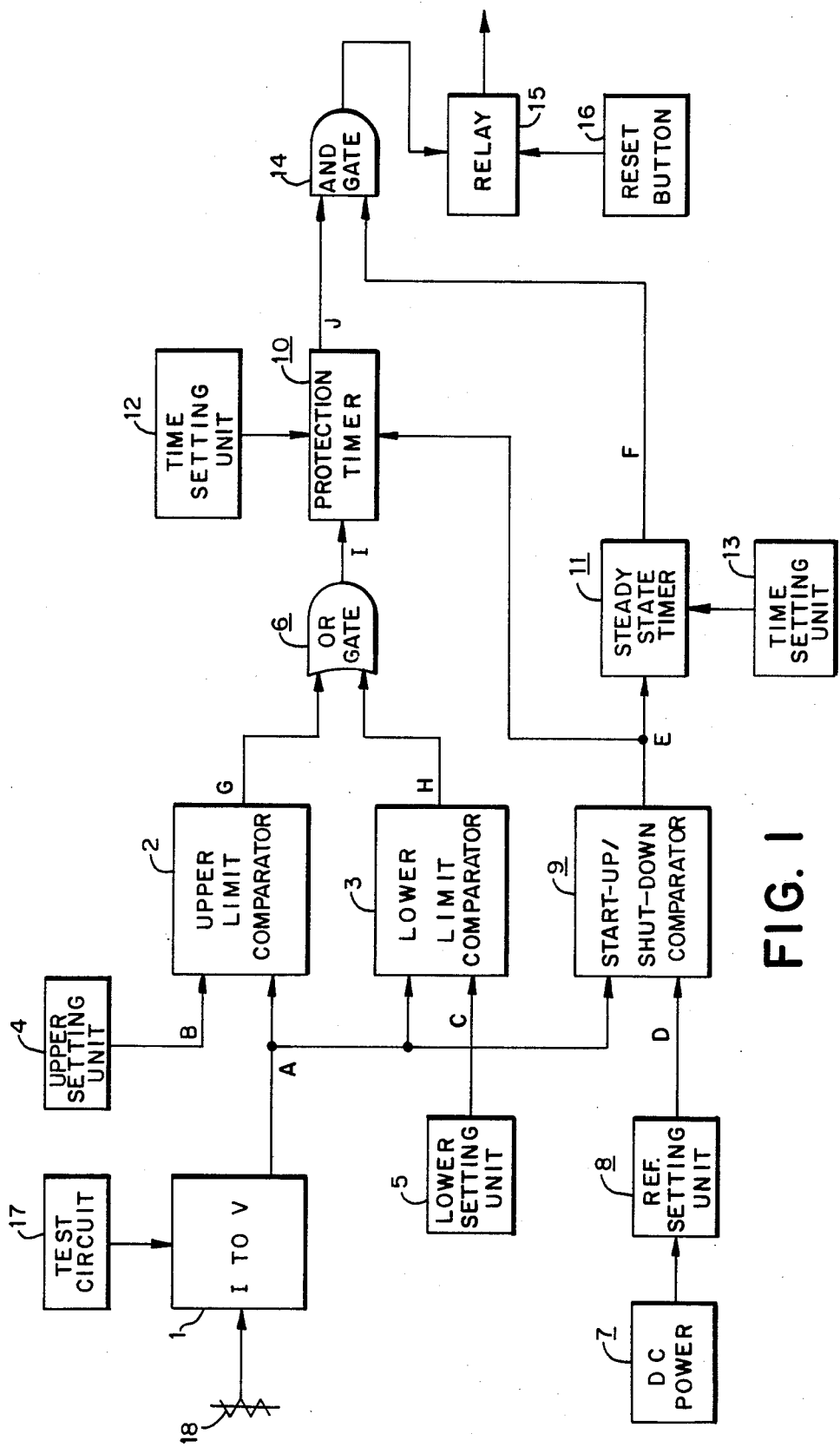
FIG. 1 is a block diagram of a protective device according to this invention; and, FIG. 2 is a detailed circuit schematic of the block diagram shown in FIG. 1.

A presently preferred embodiment of a protective device according to this invention is shown in block diagram form in FIG. 1. Inductive means, in the form of a current transformer 18, is operatively associated with an electrical supply line of a 3-phase induction motor (not shown) for driving machinery. The current signal (I) is transformed to a stable DC voltage (V) control signal A in a current-to-voltage transducer or transforming circuit 1. The voltage signal A forms an input to an upper limitation magnitude comparator 2 and a lower limitation magnitude comparator 3. Upper limitation magnitude comparator 2 generates an over-load signal output whenever the magnitude of control signal A is greater than a predetermined upper safety value B. The upper safety value B is set by voltage level setting unit 4, and corresponds to that level of current which would ordinarily be expected to be present in the supply line if the induction motor operates under over-load conditions. The lower limitation magnitude comparator 3 generates a light-load signal output whenever the magnitude of the control signal A is less than a predetermined lower safety value C. The predetermined lower safety value C is provided by voltage level setting unit 5. The lower safety value C corresponds to the value of current below that which the induction motor would operate under light-load conditions. Upper limitation magnitude comparator 2 produces an output signal G whenever the magnitude of signal A exceeds the magnitude of signal B. Lower limitation magnitude comparator 3 produces an output signal H whenever the magnitude of signal A falls below the magnitude of signal C. The output signals G and H form inputs to an OR gate 6, which produces an output signal I whenever one of the output signals G and H is produced. Accordingly, whenever the current drawn by the induction motor, as sensed by the current transformer, exceeds a predetermined value, indicating an over-load condition, or falls below a predetermined value, indicating a light-load condition, the output signal I of OR gate 6 signifies a load fault condition.

A start-up/shut-down magnitude comparator 9 has as one input the output signal A produced by the current-voltage transducer circuit 1. A reference voltage setting unit 8, powered by DC power supply circuit 7, produces a reference voltage output signal D which corresponds in magnitude, with regard to the expected range of values of output signal A, to a current level lower than a non-load current of the induction motor, for example 20% to 30% of the rated current. Reference voltage signal D is a second input to comparator 9. Start-up/shut-down magnitude comparator 9 always produces an output signal E, the polarity of which depends upon the relative magnitudes of signals A and D. If the magnitude of signal A is greater than the magnitude of signal D, the induction motor is presumed to be operating at a loaded condition. In this instance, the polarity of output signal E is positive. Whenever the magnitude of signal A falls below the magnitude of signal D, the motor is presumed to be shutting down. In this instance, the polarity of output signal E is negative. Depending upon the nature of the integrated circuits being utilized, output signal E of magnitude comparator 9 could also switch between a logical level "0" and a logical level "1".

Signal E forms an enable/inhibit control line for a protection timer 10. A positive signal E also triggers a starting timer 11. The protection timer 10 has as one input fault signal I. Whenever fault signal I is present for a period of time which exceeds the predetermined time-out of protection timer 10, an output fault persistence signal J is produced. The period of timing-out for protection timer 10 is adjusted by time setting unit 12. Accordingly, provided that the polarity of signal E is positive, whenever a fault signal I is generated, a predetermined time period begins to run by means of protection timer 10. Whenever the fault condition persists for a period of time longer than the time-out, the fault persistence output signal J is generated. If at any time the polarity of signal E becomes negative, the operation of protection timer 10 is inhibited, and no output signal J may be generated.

Steady state or starting timer 11 begins a predetermined time-out period whenever the polarity of signal E is positive. The time-out period is set to a time longer than that which is necessary for the induction motor to achieve a steady state operating condition, in which transient start-up conditions have disappeared. The predetermined time is adjusted by time setting unit 13. At the end of the time-out period, an output signal F of positive polarity (or logical level "1"), is produced. Output signal F is not generated when the polarity of signal E is negative.

Fault persistence signal J and steady state signal F form inputs to AND gate 14. Accordingly, even if a fault persistence signal J has been generated, it will be inhibited from further promulgation in the circuit if the induction motor is sensed to still be in a start-up condition with attendant transient conditions. In this way, such transient conditions will not be inadvertently mistaken for a real fault condition.

Whenever a fault persistence signal J is produced during the presence of a positive level steady state signal F, the output of AND gate 14 energizes an output relay 15, which interrupts power to the electric motor and/or sounds an alarm that the machinery is over-loaded or light-loaded. The output relay 15 may be reset by a reset button 16.

A test circuit 17 may form an alternative input to the current-voltage transformer circuit 1, in addition to current transformer 18. The test circuit should be able to produce at least a first test signal having a magnitude greater than that of upper safety value signal B and at least a second test signal having a magnitude less than the lower safety value level C, but greater than the magnitude of reference signal D.

In the embodiment of FIG. 1, a single output relay 15 is provided, which operates in response to either an over-load signal or a light-load signal. Alternatively, in place of using OR gate 6, it would be possible to utilize two protection timers 10, each of which was enabled by signal E, and two AND gates 14, each of which was enabled by steady state signal F, each of the resulting circuits being utilized to drive one of two relays 15. In such an alternative embodiment, the alarm signal could then indicate which of the over-load and light-load conditions caused interruption of operation.

Figure 2:
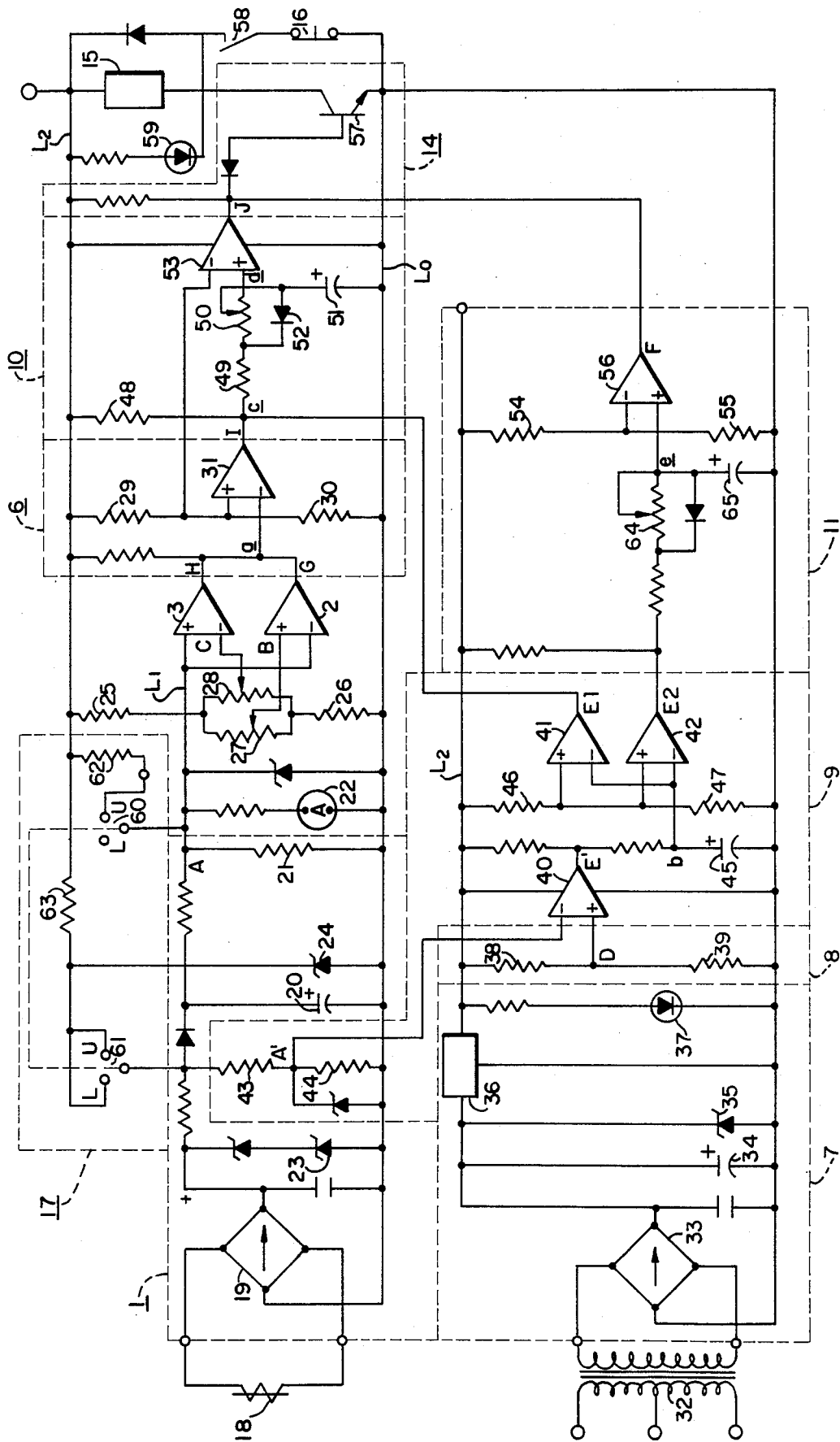

A detailed circuit diagram of an apparatus according to this invention is shown in FIG. 2. A current transformer 18 is operationally disposed in the main circuit of an electric motor. The current-voltage transducer or transforming circuit 1 includes a full-wave rectifier 19 and a shaping circuit including condenser 20, and produces voltage signal A at resistor 21, which is connected between power supply lines $L_1$ and $L_0$. The current-voltage transducer circuit also includes stable Zener diodes 23 and 24 across the output of the rectifier and an ammeter 22 for showing at least a percentage of the electric current being drawn by the electric motor. The signals B and C representing the upper and lower safety values respectively are tapped off variable resistors 27 and 28 respectively. Resistors 27 and 28 are connected to the power supply line $L_2$ of DC power supply circuit 7 through the voltage divider formed by resistors 25 and 26, respectively. The magnitudes represented by signals B and C are compared with the magnitude of signal A in comparators 2 and 3. Output signal G of comparator 2 is produced whenever the magnitude of signal A exceeds the magnitude of signal B, signal G being of negative polarity. Signal H is produced whenever the magnitude of signal A falls below the magnitude of signal C. Signal H is also a negative polarity signal. Output signals G and H are hard-wired together at point a, point a being connected to a pull-up resistor. The output of the resulting hard-wired OR gate 6 forms an input to comparator 31. The other input of comparator 31 is the output of a voltage divider network formed by resistors 29 and 30. Comparator 31 produces a fault signal I whenever the voltage at point a is decreased by the presence of output signals G or H.

The DC power supply circuit 7 is connected to the secondary winding of a power transformer 32, the primary winding of which is connected to an AC power supply. The power supply circuit 7 includes a full-wave rectifier 33, smoothing and shaping condenser 34, Zener diode 35 and voltage regulator 36. The Power-On state is displayed by light-emitting diode 37. The DC voltage is applied to a voltage dividing circuit formed by resistors 38 and 39, the output of which forms reference voltage signal D.

The start-up/shut-down comparator 9 for sensing the turning on and turning off of the motor includes three comparators 40, 41 and 42. Reference signal D forms one input to comparator 40. The other input to comparator 40 is a signal A', which is equal to the signal A, but as divided by resistors 43 and 44. Whenever the magnitude of signal A' is greater than the magnitude of signal D, an output signal E', of negative polarity, is produced. Point b sits at a voltage level which is equal to that of the power supply line $L_2$, due to the charged capacitor 45. Whenever output signal E' is produced, the voltage level at point b decreases. The voltage level at b forms one input to each of comparators 41 and 42. The other inputs respectively of comparators 41 and 42 are formed by the output of a voltage divider formed by resistors 46 and 47. Comparators 41 and 42 produce output signals $E_1$ and $E_2$ respectively, of positive polarity, whenever the voltage level at point b falls below the voltage level at the output of the voltage divider formed by resistors 46 and 47. Signals $E_1$ and $E_2$ indicate that the electric motor is in an operating condition.

In the circuitry of protection timer 10, the output of comparator 41 is connected to point C, between resistor 48 and the output of comparator 31. The voltage level at point c is held at zero when no output is produced by comparator 41. Fixed resistor 49 and variable resistor 50 connected in series to point c, and a capacitor 51 form a delay or time-out circuit. The capacitor 51 is always discharged through diode 52, whereby the voltage level at point d is held at zero. When signal $E_1$ is not generated, the voltage level at point d is held at zero even if the signal I is generated, and accordingly, the over-load protection timer 10 is kept inoperative. However, when the signals $E_1$ and I are produced, the capacitor 51 is charged, the voltage at d increasing at a rate determined by the timer constant of the R-C network including resistors 49 and 50 and capacitor 51. The voltage level at point d forms one input to comparator 53. The other input to comparator 53 is the output of the voltage divider formed by resistors 29 and 30, which also forms an input to comparator 31. When the voltage level at point d reaches the voltage level at the output of the voltage divider formed by resistors 29 and 30, comparator 53 produces a signal J, indicating that a fault condition has persisted for a predetermined period of time. The predetermined period of time may be adjusted by means of variable resistor 50, the variable resistor 50 corresponding to the time setting unit 12 shown in FIG. 1. Its value may be set in accordance with the maximum amount of time for which it is believed the machinery can experience an over-load or light-load condition without being damaged, and at the same time, being set long enough so that transient conditions are not mistaken for fault conditions.

Steady state or starting timer 11 has a circuit configuration similar to that of protection timer 10. When signal $E_2$ is produced, the voltage level at point e is increased at a rate determined by the time constant of the R-C network including variable resistor 64 and capacitor 65, which together form time setting unit 13. When the voltage level at point e reaches the voltage level at the output of the voltage divider formed by resistors 54 and 55, comparator 56 produces an output signal F.

An AND gate 14 is formed by transistor 57. When each of comparators 53 and 56 produce output signals J and F, respectively, and simultaneously, transistor 57 becomes conductive. When transistor 57 becomes conductive, output relay 15 is energized and a self-holding switch contact point 58 is closed. A light-emitting diode 59 is provided for indicating that the output relay 15 has been operated.

Test circuit 17 includes cooperative manual switches 60 and 61. When the switches are set to a point U, a voltage level higher than the maximum desired value of signal B is applied to the power supply line $L_1$ through resistors 62 and 63, resulting in the generation of signal G by comparator 2 and the generation of signal E' by comparator 40. The test circuit thereby simulates the presence of an over-load condition. Alternatively, when switches 60 and 61 are set to a point L, a voltage level lower than a minimum desired value for signal C is applied to resistor 21, through resistor 63, resulting in generation of signal H by comparator 3 and signal E' by comparator 40. The test circuit thereby simulates a light-load condition.

In view of the foregoing arrangement, no electrical wiring is necessary other than that required for connecting the current transformer to sense the electric current in one of the main circuits for the electric motor driving the machinery. The protective relay is prevented from operation during start-up and shut-down of the electric motor, in order that there be no confusion with over-load or light-load fault conditions. Accordingly, positive protection against over-load and light-load conditions may be provided, while eliminating spurious operation due to transient conditions.

This invention may be embodied in other specific forms without departing from the spirit or essential attributes thereof, and accordingly, reference should be made to the appended claims rather than to the foregoing specification, as indicating the scope of the invention.

What is claimed is:

1. An apparatus for protecting machinery driven by electric motors from operating during over-load and light-load conditions, comprising:
    inductive means, operatively associated with an electrical supply line for the induction motor, for generating a control signal having a magnitude proportional to current flowing in the supply line;
    an upper limitation magnitude comparator for generating an over-load signal output whenever the magnitude of the control signal exceeds a predetermined upper safety value;

a lower limitation magnitude comparator for generating a light-load signal output whenever the magnitude of the control signal is less than a predetermined lower safety level;

an inhibitable protection timer for producing a fault persistence output signal whenever one of the over-load and light-load signal outputs is generated for a period of time longer than a predetermined protection time;

a steady state timer for inhibiting an enable output signal for a predetermined period of time after start-up and during shut-down of the electric motor;

a start-up/shut-down comparator for producing an output signal for enabling operation of the protection timer and the steady state timer whenever the magnitude of the control signal exceeds a predetermined reference value corresponding to an electric current lower than the unloaded current of the electric motor; and an output relay for interrupting operation of the electric motor when both the protection timer and the steady state timer produce time coincident output signals.

2. The apparatus of claim 1, further comprising a test circuit for generating voltage signals having magnitudes corresponding to and simulating over-load and light-load conditions.

3. The apparatus of claim 2, wherein the test circuit comprises means for generating a first test signal having a magnitude greater than the upper safety value and a second test signal having a magnitude less than the lower safety value, yet greater than the reference value.

4. The apparatus of claim 3, further comprising a manually activatable switch for connecting the signal generating means of the test circuit to the comparators and for disconnecting the inductive means.

5. The apparatus of claim 1, wherein the inductive means comprises a current transformer.

6. The apparatus of claim 1, wherein the predetermined reference value of the start-up/shut-down comparator is in the range of 20% to 30% of the rated current of the electric motor.

7. The apparatus of claim 1, wherein the predetermined period of time of the steady state timer exceeds the time necessary for the electric motor to achieve a steady state operating condition after being turned on.

8. The apparatus of claim 1, further comprising at least one fault alarm, activatable by the output relay.

9. The apparatus of claim 1, wherein the output relay comprises a self-holding switch contact point.

* * * * *